US010745574B2

(12) United States Patent
Tarng et al.

(10) Patent No.: US 10,745,574 B2
(45) Date of Patent: Aug. 18, 2020

(54) HIDING BY USING AIR VOIDS ENCAPSULATED IN HOLLOW GLASS SPHERES

(71) Applicant: BEHR PROCESS CORPORATION, Santa Ana, CA (US)

(72) Inventors: Ming-Ren Tarng, Irvine, CA (US); Ying-Chieh Yen, Irvine, CA (US); Jinzhen Shi, Fountain Valley, CA (US); Roanic Greydon Cantrell, Riverside, CA (US); Chenming Xue, Tustin, CA (US)

(73) Assignee: BEHR PROCESS CORPORATION, Santa Ana, CA (US)

( * ) Notice: Subject to any disclaimer, the term of this patent is extended or adjusted under 35 U.S.C. 154(b) by 337 days.

(21) Appl. No.: 15/290,512

(22) Filed: Oct. 11, 2016

(65) Prior Publication Data
US 2018/0100072 A1 Apr. 12, 2018

(51) Int. Cl.
| | | |
|---|---|---|
| *C09D 129/04* | (2006.01) | |
| *C09D 7/40* | (2018.01) | |
| *C09D 7/61* | (2018.01) | |
| *C09D 5/02* | (2006.01) | |
| *C09D 133/16* | (2006.01) | |
| *C09D 129/02* | (2006.01) | |
| *C08K 7/28* | (2006.01) | |
| *C08K 3/22* | (2006.01) | |

(52) U.S. Cl.
CPC .............. *C09D 7/70* (2018.01); *C09D 5/024* (2013.01); *C09D 7/61* (2018.01); *C09D 7/69* (2018.01); *C09D 129/02* (2013.01); *C09D 129/04* (2013.01); *C09D 133/16* (2013.01); *C08K 7/28* (2013.01); *C08K 2003/2241* (2013.01)

(58) Field of Classification Search
CPC . C09D 5/024; C09D 7/61; C09D 7/69; C09D 7/70; C09D 129/02; C09D 129/04; C09D 133/16
See application file for complete search history.

(56) References Cited

U.S. PATENT DOCUMENTS

| | | |
|---|---|---|
| 4,378,408 A | 3/1983 | Joedicke |
| 5,171,631 A | 12/1992 | Adkins |
| 5,385,960 A | 1/1995 | Emmons et al. |
| 6,080,802 A | 6/2000 | Emmons et al. |
| 6,646,058 B1 | 11/2003 | Koger |
| 7,488,534 B2 | 2/2009 | Koller et al. |
| 7,717,992 B2 | 5/2010 | Klots et al. |
| 8,287,998 B2 | 10/2012 | Skelhorn |
| 8,318,848 B2 | 11/2012 | Finegan et al. |
| 8,470,910 B2 * | 6/2013 | Fasano ................... C09D 5/028 523/218 |
| 8,785,533 B2 | 7/2014 | Chamberlain et al. |
| 9,017,781 B2 | 4/2015 | O'Brien et al. |
| 9,096,765 B2 | 8/2015 | Chamberlain et al. |
| 9,206,320 B1 | 12/2015 | Daly et al. |
| 2011/0159309 A1 | 6/2011 | Jiang et al. |
| 2012/0121886 A1 | 5/2012 | Huang et al. |
| 2013/0101861 A1 | 4/2013 | Cao et al. |
| 2014/0087070 A1 | 3/2014 | Liu et al. |
| 2018/0100072 A1 | 4/2018 | Tarng et al. |

FOREIGN PATENT DOCUMENTS

WO 2015/138117 A1 9/2015

OTHER PUBLICATIONS

"Ropaque OP-96 All-purpose Pigment", Dow no date available.*
SPHERICEL® for Applicationsin Paint and Coatings—Product Description and Benefits, Potters Industries, Inc., 2 pgs.
Using Hollow Glass Spheres in Paints and Coatings, Potters, 4 pgs.
Carlozzo, B.J., "The Use of Spherical Extenders in VOC Compliant Coatings," J. of Coatings Technology, 1997, 15 pgs.
"How to Use SPHERICEL® 110P8 Hollow Glass Spheres in Your Coating Application," SPHERICEL® Hollow Glass Spheres, Potters Industris Inc., 1998, 2 pgs.
Shaker, B. et al., "SPHERICEL® Hollow Glass Microspheres Offer Previously Unattainable Properties", Paint & Coatings Industry magazine, 2005, 4 pgs.

* cited by examiner

*Primary Examiner* — Edward J Cain
(74) *Attorney, Agent, or Firm* — Brooks Kushman P.C.

(57) ABSTRACT

A paint composition with improved hiding power includes water, a film-forming polymer, pigments, and a plurality of hollow glass spheres dispersed in the paint composition. Advantageously, the hollow glass spheres encapsulate air voids in coatings formed from the paint composition.

22 Claims, 4 Drawing Sheets

Cross-sectional SEM image of the paint film with hollow glass spheres

Top-view SEM image of the paint film with hollow glass spheres

HIDING BY USING AIR VOIDS ENCAPSULATED IN HOLLOW GLASS SPHERES

TECHNICAL FIELD

In at least one embodiment, the present invention is related to paint compositions with improved hiding power.

BACKGROUND

Paint coatings are ubiquitous finding numerous applications for both aesthetic and functional applications. In many applications, paint coatings are applied to improve the aesthetic appeal of a surface by providing a uniform and pleasing appearance.

In this regard, it is known that many coating compositions do not cover substrate well when the substrate is colored. In these situations, multiple coatings are frequently necessary leading to extra expense and significantly longer times to paint a surface.

Accordingly, there is a need for paint compositions with improved hiding power when applied to a substrate.

SUMMARY

In at least one embodiment, the present invention solves one or more problems of the prior art by providing a paint composition with improved hiding power. The paint composition includes water, a film-forming polymer, pigments, and a plurality of hollow glass spheres (i.e. glass bubbles) dispersed in the paint composition. Advantageously, the hollow glass spheres encapsulate air voids in coatings formed from the paint composition.

In another embodiment, a paint composition having improved hiding power is provided. The paint composition includes water, a film-forming polymer, pigments, and a plurality of hollow glass spheres dispersed in the paint composition. As above, the hollow glass spheres encapsulate air voids in coatings formed from the paint composition. Characteristically, the hollow glass spheres are present in an amount from about 0.1 to 8 weight percent of the total weight of the paint composition.

Embodiments of the present invention provide relatively better hiding at lower loading level (resulting from lower density than $TiO_2$ and most extender pigments) than many prior art compositions for increasing hiding power. The present invention achieves these results while also exhibiting improved flow and leveling with lower $TiO_2$ loading.

DETAILED DESCRIPTION

Figure 1:
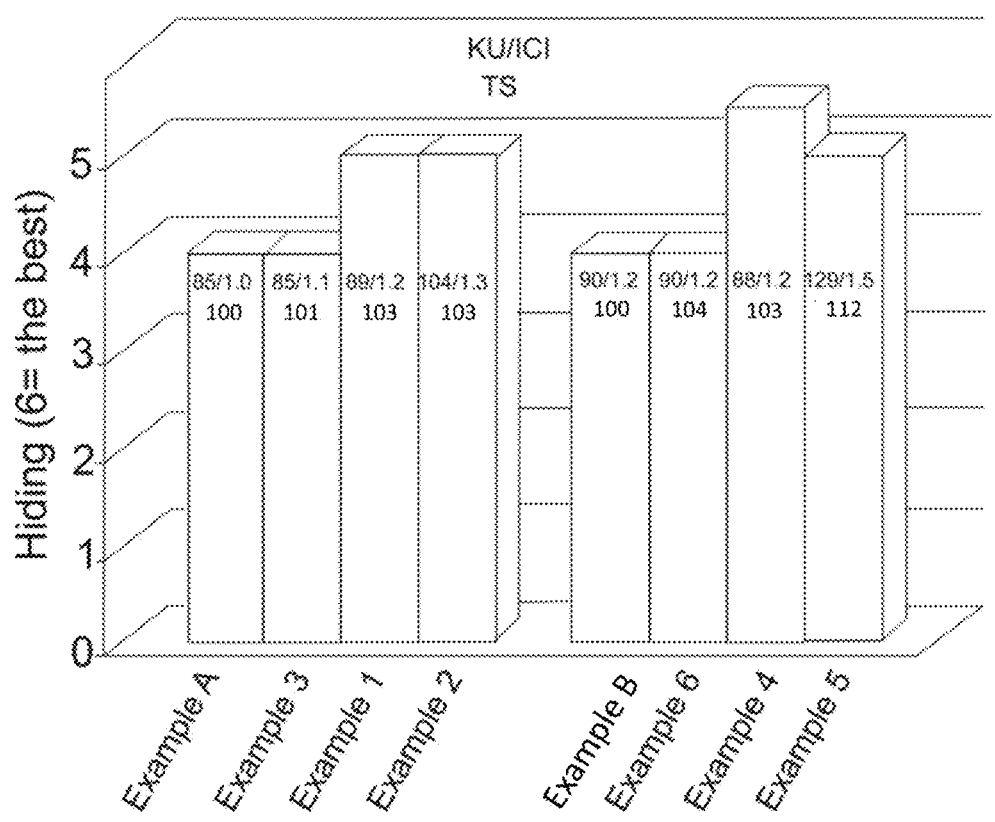
FIG. 1 provides a bar chart comparing hiding power, KU/ICI viscosity, and tinting strength for several paint compositions.

Reference will now be made in detail to presently preferred compositions, embodiments and methods of the present invention, which constitute the best modes of practicing the invention presently known to the inventors. The Figures are not necessarily to scale. However, it is to be understood that the disclosed embodiments are merely exemplary of the invention that may be embodied in various and alternative forms. Therefore, specific details disclosed herein are not to be interpreted as limiting, but merely as a representative basis for any aspect of the invention and/or as a representative basis for teaching one skilled in the art to variously employ the present invention.

Except in the examples, or where otherwise expressly indicated, all numerical quantities in this description indicating amounts of material or conditions of reaction and/or use are to be understood as modified by the word "about" in describing the broadest scope of the invention. Practice within the numerical limits stated is generally preferred. Also, unless expressly stated to the contrary: percent, "parts of," and ratio values are by weight; the term "polymer" includes "oligomer," "copolymer," "terpolymer," and the like; molecular weights provided for any polymers refers to weight average molecular weight unless otherwise indicated; the description of a group or class of materials as suitable or preferred for a given purpose in connection with the invention implies that mixtures of any two or more of the members of the group or class are equally suitable or preferred; description of constituents in chemical terms refers to the constituents at the time of addition to any combination specified in the description, and does not necessarily preclude chemical interactions among the constituents of a mixture once mixed; the first definition of an acronym or other abbreviation applies to all subsequent uses herein of the same abbreviation and applies mutatis mutandis to normal grammatical variations of the initially defined abbreviation; and, unless expressly stated to the contrary, measurement of a property is determined by the same technique as previously or later referenced for the same property.

It is also to be understood that this invention is not limited to the specific embodiments and methods described below, as specific components and/or conditions may, of course, vary. Furthermore, the terminology used herein is used only for the purpose of describing particular embodiments of the present invention and is not intended to be limiting in any way.

It must also be noted that, as used in the specification and the appended claims, the singular form "a," "an," and "the" comprise plural referents unless the context clearly indicates otherwise. For example, reference to a component in the singular is intended to comprise a plurality of components.

The term "comprising" is synonymous with "including," "having," "containing," or "characterized by." These terms are inclusive and open-ended and do not exclude additional, unrecited elements or method steps.

The phrase "consisting of" excludes any element, step, or ingredient not specified in the claim. When this phrase appears in a clause of the body of a claim, rather than immediately following the preamble, it limits only the element set forth in that clause; other elements are not excluded from the claim as a whole.

The phrase "consisting essentially of" limits the scope of a claim to the specified materials or steps, plus those that do not materially affect the basic and novel characteristic(s) of the claimed subject matter.

The terms "comprising", "consisting of", and "consisting essentially of" can be alternatively used. When one of these three terms is used, the presently disclosed and claimed subject matter can include the use of either of the other two terms.

Throughout this application, where publications are referenced, the disclosures of these publications in their entireties are hereby incorporated by reference into this application to more fully describe the state of the art to which this invention pertains.

The term "hiding power" means the ability of a coating to hide the surface of a substrate. Hiding power can be determined by ASTM D2805-96a (Approved May 10, 2003. Published June 2003) and D344-97 (Approved Nov. 1, 2004. Published November 2004.); the entire disclosures of which are hereby incorporated by reference.

In an embodiment, a paint composition with improved hiding power is provided. The paint composition includes water, a film-forming polymer, pigments, and a plurality of hollow glass spheres dispersed in the paint composition. Advantageously, the hollow glass spheres encapsulate air voids in coatings formed from the paint composition. In a refinement, the hollow glass spheres have an average diameter from about 5 to about 25 microns. In another refinement, hollow glass spheres have an average diameter from about 10 to about 20 microns. In still other refinements, the hollow glass spheres have an average diameter greater than or equal to, in increasing order of preference, 1, 2, 5, 8, 10, 12, or 15 microns and less than or equal to, in increasing order of preference, 50, 40, 35, 30, 25, 20, 18 or 16 microns. It should be appreciated that the combination of hollow glass spheres with virtually any film forming polymer can result in improved hiding power. Advantageously, the hollow glass spheres can replace a portion of the pigments or be added in addition to pigments in a standard paint composition. In this context, a standard paint composition is a paint composition that has been formulated and used for paint applications. Although the improvements observed in hiding power do not depend on any particular mechanism, it is hypothesized that air voids encapsulated in the hollow glass spheres can scatter light while the glass bubbles can work as a matting agent. This is thought to result in both improved intrinsic and application hiding power with a desired sheen. This combination of properties is not achieved by conventional pigments, opaque polymers, or even $TiO_2$ at the same volume solid level.

In many applications, the film-forming polymer is an emulsion polymer. Suitable emulsion polymers includes, But are not limited to, acrylic polymers, vinyl acrylic copolymers, ethylene-vinyl acetate copolymers, styrene-acrylic copolymers, polyvinyl alcohol, and combinations thereof. Suitable film forming polymers are formed from one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropylacrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, ethylene, propylene, 1-butylene, 2 butylene, vinyl acetate, functional monomers (e.g., phosphorous-containing monomers), acid group monomers, and combinations thereof. Specific examples of phosphorus-containing functional monomers are discloses in U.S. Pat. Nos. 5,385,960; 6,080,802; 7,488,534; and 8,318,8483; the entire disclosures of which are hereby incorporated by reference. Examples of acidic group monomers are disclosed in U.S. Pat. No. 6,080,802.

Typically, the paint composition includes the film-forming polymer in an amount from about 25 to 60 weight percent of the total weight of the paint composition, the pigments in an amount from about 5 to 40 weight percent of the total weight of the paint composition, and the plurality of hollow glass spheres in an amount from about 0.1 to 8 weight percent of the total weight of the paint composition with the balance being water. In another embodiment, the paint composition includes the film-forming polymer in an amount from about 40 to 50 weight percent of the total weight of the paint composition, the pigments in an amount from about 10 to 30 weight percent of the total weight of the paint composition and the plurality of hollow glass spheres in an amount from about 0.1 to 8 weight percent of the total weight of the paint composition with the balance being water. Alternatively expressed, the paint composition includes the plurality of hollow glass spheres in an amount of 5 to 65 pounds of hollow glass spheres per 100 gallons of paint. In a refinement, the paint composition includes the plurality of hollow glass spheres in an amount of 10-40 pounds of hollow glass spheres per 100 gallons of paint. In still another refinement, the paint composition includes the plurality of hollow glass spheres in an amount of 20-30 pounds of hollow glass spheres per 100 gallons of paint.

As set forth above, the paint composition includes one or more pigments. Suitable pigments are azo dyes, phthalocyanine, anthraquinone dyes, titanium oxide, calcium carbonate, iron oxides (black, yellow and red), zinc oxide and carbon black, powdered metals, metal compounds (e.g., zinc phosphate), and combinations thereof. In a variation, the paint composition can include a matting agent to adjust the gloss to a lower sheen. The matting agent can be any extender pigments, such as silicas, nepheline syenite, calcined kaolin, diatomaceous earth, mica, calcium carbonate, and the like. In a refinement, the matting agent is present in an amount from about 0.2 to 10 percent of the dry weight of the paint composition.

In some variations, the paint composition further includes one or more additives selected from the group consisting of rheology modifiers, surfactants, defoamers, organic solvents, pH adjusters, UV stablizers, dispersants, coalescents, biocides, inorganic pigment, organic pigments, and combinations thereof. Typically, the additives are present in an amount from about 0.1 to 20 weight percent of the total weight of the paint composition.

The following examples illustrate the various embodiments of the present invention. Those skilled in the art will recognize many variations that are within the spirit of the present invention and scope of the claims.

Comparison Between Reference and Hiding-Enhanced Paint Compositions

Table 1 provides the basic formulation for Examples A and 1-3. Example A was used as a reference. Examples 1-3 were formulated by replacing 2 wt. % of pigment 2 with other ingredients in equal volume solid. As listed in Table 1, the 2 wt. % of pigment 1 was replaced with 0.5 wt. % glass bubbles, 4.5 wt. % TiO2 slurry, and 1.6 wt. % opaque polymers in Examples 1, 2, and 3, respectively. In each of these samples, the amount of water was adjusted accordingly to keep the solids volume the same for Examples A, 1, 2, and 3. Several paint properties are listed in Table 2, showing that 0.5 wt. % glass bubbles (Example 1) are able to provide a tint strength (TS) level close to that provided by TiO2 slurry (Example 2). Example 2 exhibited 19 units higher KU compared with Examples A, 1, and 3 while there is no obvious difference in ICI and contrast ratio between these four samples. In addition, the glass bubbles can also have a certain degree of matting strength (could be varied via changing particle size), leading to lower 60° and 85° gloss compared with the TiO₂ slurry and opaque polymer examples. The KU and ICI (ASTM-D 4287-00 standard) viscosities were measured by Brookfield Model KU-1 Viscometer and BYK Gardner CAP 1000 Viscometer, respectively.

For the contrast ratio, paints were applied to the Leneta 3B chart using a certified 3 mil Bird Bar. The contrast ratio was measured after a 24 hour air dry through an X-Rite SP-64 spectrophotometer, defined as percentage of reflectance over black divided by reflectance over white. The tint strength was measured after a 24 hour air dry via X-Rite SP-64 spectrophotometer by the drawdown of paints tinted with low VOC lamp black colorant dispersion on the Leneta 1B chart casted through a certified 3 mil Bird Bar. The gloss was measured by using BYK Gardner Micro-TRI-Gloss to the drawdown on the Leneta 3B chart applied through a 3 mil Bird Bar after 24 hours air dry.

The hiding score was evaluated on both the Leneta 24B and P300-7C charts by applying the drawdown via 3 mil Bird Bar and a 24 hours air dry. For the drawdown on the Leneta 24B chart, the hiding score was given according to the highest grey level that the white paint can cover while the samples of the invention gave hiding scores from 1 to 5 (5 is the best) for the drawdown on the clear Leneta P300-7C chart.

In order to investigate a relatively higher material loading level, Examples B, 4, 5, and 6 were prepared. The basic formulation and properties of these examples are listed in Tables 3 and 4, respectively, showing that the glass bubbles (Example 4) can still provide tint strength level closed to that the opaque polymer (Example 6) can provide. Although Example 5 (TiO₂ slurry) exhibits 9 units higher tint strength than Example 4 (glass bubbles), the high viscosity reflects the worse stability of high TiO₂ loading.

FIG. 1 is a bar chart that compares the intrinsic hiding power of Examples A and 1-3, and B and 4-6 on the Leneta 24B chart prepared by using 3 mil Bird Bar. Example 1, with 0.5 wt. % glass bubbles, provided the best hiding compared to Examples A (2 wt. % pigment 2), 2 (4.5 wt. % TiO₂ slurry), and 3 (1.6 wt. % opaque polymer). Example 4 with 1 wt. % glass bubbles provided better hiding than 4 wt. % pigment 2 (Example B), 9 wt. % TiO2 slurry (Example 5), and 3.2 wt. % opaque polymer (Example 6).

Figure 2:
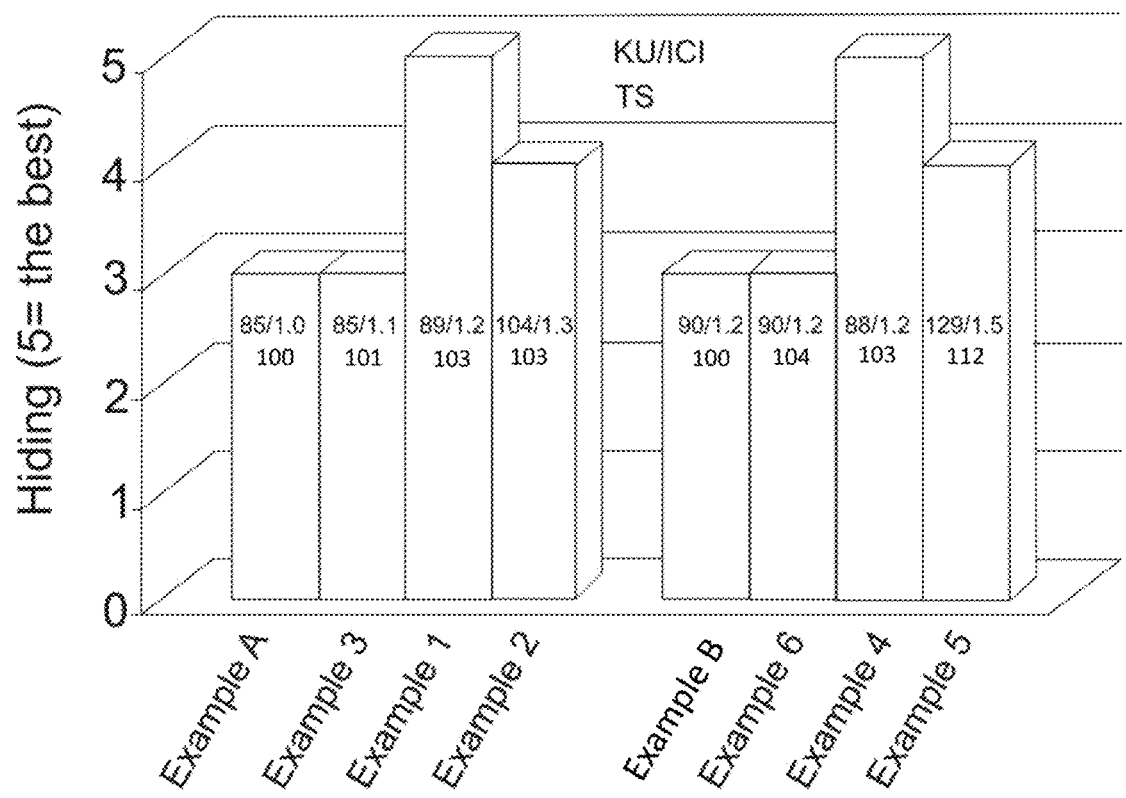
FIG. 2 provides a bar chart comparing hiding power, KU/ICI viscosity, and tinting strength for several paint compositions.

FIG. 2 is a bar chart that compares the intrinsic hide between Examples A and 1-3, and B and 4-6 on the Leneta P300-7C chart prepared by using 3 mil Bird Bar. Again, paint with glass bubbles, Examples 1 and 4 can always provide a better hiding compared to other materials under the same volume solid level.

TABLE 1

Example Formula 1-3 for Flat Paint

| Material | Comparison Example A | Example 1 | Example 2 | Example 3 |
|---|---|---|---|---|
| | Weight % | | | |
| Acrylic Polymer | 39-43 | | | |
| TiO₂ Slurry (76 wt %) | 28-30 | | | |
| Water | 7.5-10 | | | |
| Ethylene Glycol | 1-3 | | | |
| High Shear Rheology Modifier | 0.5-2 | | | |
| Coalescent Agent | 0.5-2.5 | | | |
| Dispersant | 0.5-1.5 | | | |
| Wetting Agent | 0.5-1.5 | | | |
| Mildewcide | 0.2-0.4 | | | |
| Defoamer | 0.35-0.55 | | | |
| Opaque Polymer | 3-5 | | | |
| Low Shear Rheology Modifier | 0.05-0.1 | | | |
| Other Additives | 0.4-0.8 | | | |
| In-can Preservative | 0.2-0.5 | | | |
| Pigment 1 | 6.5-8.5 | | | |
| Pigment 2 | 4 | | | |
| Additional Ingredients for Comparison | | | | |
| Pigment 2 | 2 | — | — | — |
| Glass Bubble 1 | — | 0.5 | — | — |
| TiO₂ Slurry | — | — | 4.5 | — |
| Opaque Polymer | — | — | — | 1.6 |

TABLE 2

Paints Properties

| | Comparison Example A | Example 1 | Example 2 | Example 3 |
|---|---|---|---|---|
| Solid volume % | 43.4% | 43.4% | 43.4% | 43.4% |
| Tint Strength | 100 | 103 | 103 | 101 |
| Contrast Ratio | 98.18 | 98.32 | 98.41 | 98.13 |
| Viscosity, ICI (3 Days) | 1.0 | 1.2 | 1.3 | 1.1 |
| Viscosity, (KU (3 Days) | 85 | 85 | 104 | 89 |
| 60°/85° Gloss (3 Days) | 5.5/5.1 | 6.1/5.8 | 6.8/7.1 | 7.3/8.7 |
| Hiding Score (24B chart) | 4 | 5 | 5 | 4 |
| Hiding Score (P300-7C chart) | 3 | 5 | 4 | 3 |

TABLE 3

Example Formula 4-6 for Flat Paint

| Material | Comparison Example B | Example 4 | Example 5 | Example 6 |
|---|---|---|---|---|
| | Weight % | | | |
| Acrylic Polymer | 39-43 | | | |
| TiO₂ Slurry (76 wt %) | 28-30 | | | |
| Water | 7.5-10 | | | |
| Ethylene Glycol | 1-3 | | | |
| High Shear Rheology Modifier | 0.5-2 | | | |
| Coalescent Agent | 0.5-2.5 | | | |
| Dispersant | 0.5-1.5 | | | |
| Wetting Agent | 0.5-1.5 | | | |
| Mildewcide | 0.2-0.4 | | | |
| Defoamer | 0.35-0.55 | | | |

TABLE 3-continued

Example Formula 4-6 for Flat Paint

| Material | Comparison Example B | Example 4 | Example 5 | Example 6 |
|---|---|---|---|---|
| | Weight % | | | |
| Opaque Polymer | 3-5 | | | |
| Low Shear Rheology Modifier | 0.05-0.1 | | | |
| Other Additives | 0.4-0.8 | | | |
| In-can Preservative | 0.2-0.5 | | | |
| Pigment 1 | 6.5-8.5 | | | |
| Pigment 2 | 4 | | | |
| Additional Ingredients for Comparison | | | | |
| Pigment 2 | 4 | — | — | — |
| Glass Bubble 1 | — | 1 | — | — |
| TiO₂ Slurry | — | — | 9 | — |
| Opaque Polymer | — | — | — | 3.2 |

TABLE 4

Paints Properties

| | Comparison Example B | Example 4 | Example 5 | Example 6 |
|---|---|---|---|---|
| Solid volume % | 44.4% | 44.4% | 44.4% | 44.4% |
| Tint Strength | 100 | 103 | 112 | 104 |
| Contrast Ratio | 98.38 | 98.6 | 98.6 | 98.48 |
| Viscosity, ICI (3 Days) | 1.2 | 1.2 | 1.5 | 1.2 |
| Viscosity, (KU (3 Days) | 90 | 88 | 129 | 90 |
| 60°/85° Gloss (3 Days) | 5.2/4.8 | 5.7/5.6 | 7.3/8.3 | 7.1/8.3 |
| Hiding Score (24B chart) | 4 | 5.5 | 5 | 4 |
| Hiding Score (P300-7C chart) | 3 | 5 | 4 | 3 |

Application Hide and Intrinsic Hide Improvement

Table 5 lists extender pigment packages for two typical examples, Examples C and 7. The preparation and formulation of these examples follow the basic formulation as set forth above, but with an adjusted thickener package and water level to achieve desired paint properties.

Examples C and 7 were applied on a Leneta grey chart with a ⅜ inch nap paint roller. The application hide of example 7 (with glass bubbles) was obviously improved compared to Example C. According to the grey level on the Leneta grey (CU-1M) chart, Example 7 with glass bubbles achieved at least one level higher than the control in hiding. It is worthy to address that there is no obvious difference in the contrast ratio, viscosity, and gloss between examples C and 7 (listed in Table 5), revealing that the glass bubbles do have their unique behavior for improving hiding.

TABLE 5

Example Formula 7 for Flat Paint

| Material | Comparison Example C | Example 7 |
|---|---|---|
| | Weight % | |
| Acrylic Polymer | 39-43 | |
| TiO₂ Slurry (76 wt %) | 28-30 | |
| Water | 7.5-10 | |
| Ethylene Glycol | 1-3 | |
| High Shear Rheology Modifier | 0.5-2 | |
| Coalescent Agent | 0.5-2.5 | |
| Dispersant | 0.5-1.5 | |
| Wetting Agent | 0.5-1.5 | |
| Mildewcide | 0.2-0.4 | |
| Defoamer | 0.35-0.55 | |
| Opaque Polymer | 3-5 | |
| Low Shear Rheology Modifier | 0.05-0.1 | |
| Other Additives | 0.4-0.8 | |
| In-can Preservative | 0.2-0.5 | |
| Additional Ingredients for Comparison | | |
| Extender Pigment 1 | 7.5 | 5.5 |
| Extender Pigment 2 | 9.5 | 3 |
| Glass Bubble 1 | — | 2 |
| Paint Properties | | |
| Tint Strength | 100 | 100 |
| Contrast Ratio | 98.38 | 98.6 |
| Viscosity, ICI (3 Days) | 1.5 | 1.2 |
| Viscosity, KU (3 Days) | 113 | 110 |
| 60°/85° Gloss | 4.9/4.6 | 5.2/3.8 |

Table 6 lists another two examples used for the study of hiding development upon time (examples D and 8). Again, the preparation and formulation of these examples follow the basic formulation as aforementioned with adjusted thickener package and water level accordingly to achieve appropriate paint property.

Figure 3:
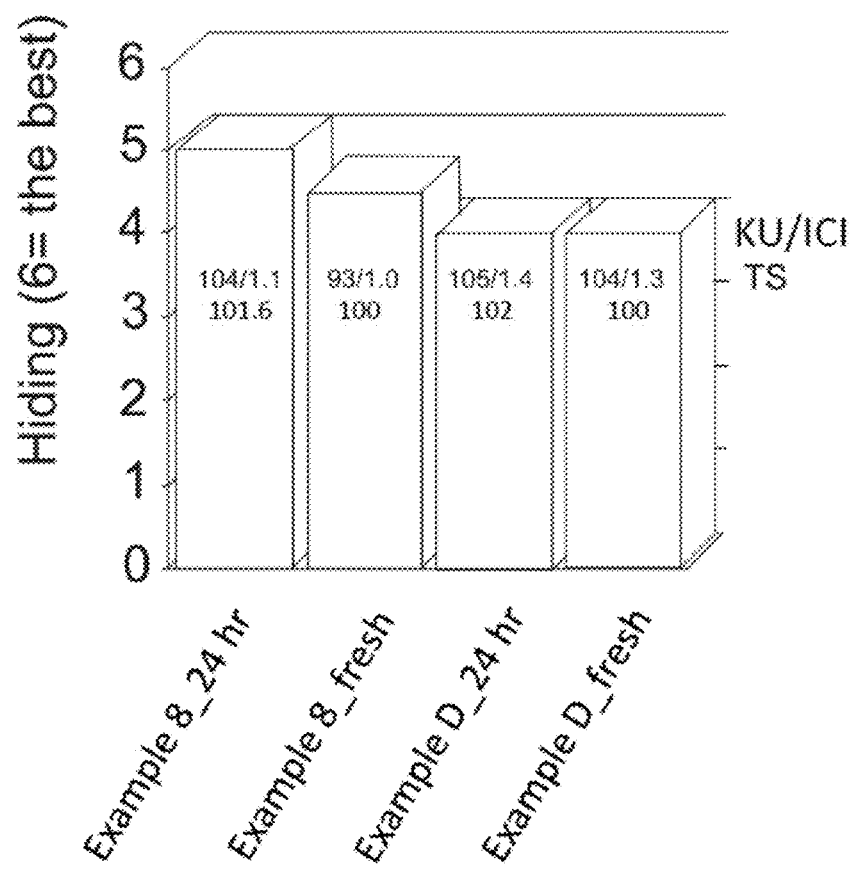
FIG. 3 provides a bar chart comparing hiding power, KU/ICI viscosity, and tinting strength for several paint compositions.
Figure 4:
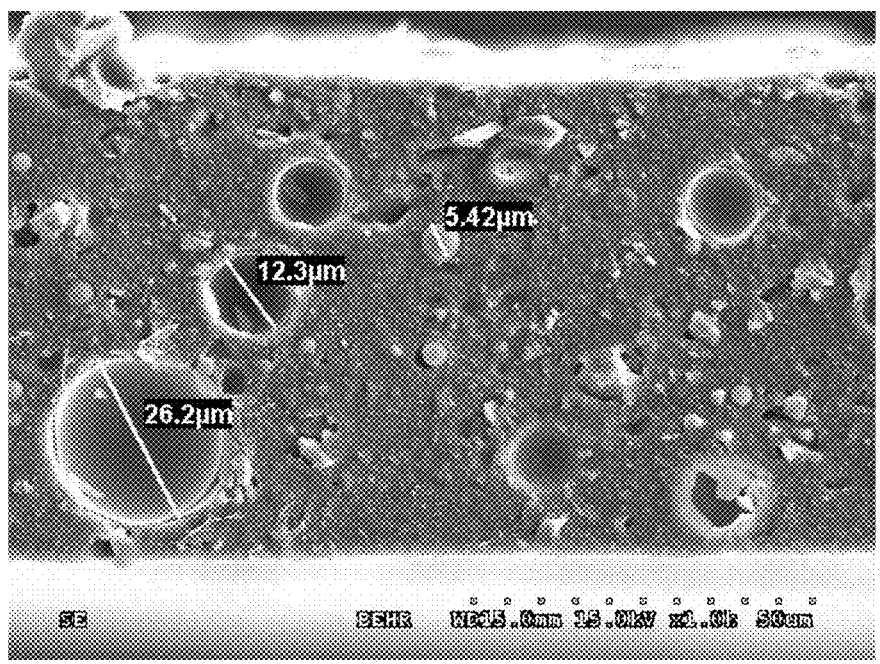
FIG. 4 provides the SEM images, both cross-sectional and top-view, of the paint film that contains hollow glass spheres
Figure 4:
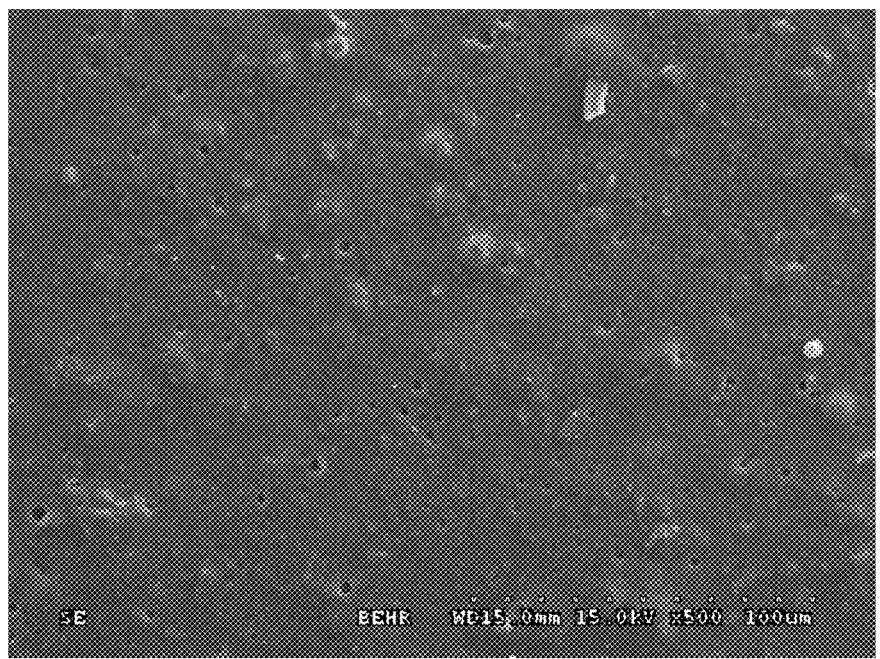

FIG. 3 is a bar chart that compares the intrinsic hide between Examples D and 8 on the Leneta 24B chart with different age, indicating that the intrinsic hide of example 8 with glass bubbles can be one level higher than the example D after 24 hours while the samples have similar viscosity, contrast ratio (not listed here), and tint strength. The results are consistent with the aforementioned that the glass bubbles are able to improve hiding.

TABLE 6

Example Formula 8 for Flat Paint

| Material | Comparison Example D | Example 8 |
|---|---|---|
| | Weight % | |
| Acrylic Polymer | 39-43 | |
| TiO₂ Slurry (76 wt %) | 28-30 | |
| Water | 7.5-10 | |
| Ethylene Glycol | 1-3 | |
| High Shear Rheology Modifier | 0.5-2 | |
| Coalescent Agent | 0.5-2.5 | |
| Dispersant | 0.5-1.5 | |
| Wetting Agent | 0.5-1.5 | |
| Mildewcide | 0.2-0.4 | |
| Defoamer | 0.35-0.55 | |
| Opaque Polymer | 3-5 | |
| Low Shear Rheology Modifier | 0.05-0.1 | |

TABLE 6-continued

Example Formula 8 for Flat Paint

| | |
|---|---|
| Other Additives | 0.4-0.8 |
| In-can Preservative | 0.2-0.5 |

Additional Ingredients for Comparison

| | | |
|---|---|---|
| Extender Pigment 1 | 7.7 | 7 |
| Extender Pigment 2 | 9.5 | 4.7 |
| Glass Bubble 1 | — | 2 |

Paint Properties

| | Comparison Example D_24 hr | Example 8_24 hr |
|---|---|---|
| Hiding Score (24B chart) | 4 | 5 |

Table 7 list another example of flat paint with glass bubble 2 at higher loading level, 5.5% of total weight of formulation, to completely replace extender pigment 2.

TABLE 7

Example Formula 9 for Flat Paint

| Material | Comparison Example E Weight % | Example 9 |
|---|---|---|
| Acrylic Polymer | 39-43 | |
| TiO$_2$ Slurry (76 wt %) | 28-30 | |
| Water | 5-10 | |
| Ethylene Glycol | 1-3 | |
| High Shear Rheology Modifier | 0.5-2 | |
| Coalescent Agent | 0.5-2.5 | |
| Dispersant | 0.5-1.5 | |
| Wetting Agent | 0.5-1.5 | |
| Mildewcide | 0.2-0.4 | |
| Defoamer | 0.35-0.55 | |
| Opaque Polymer | 3-5 | |
| Low Shear Rheology Modifier | 0.05-0.1 | |
| Other Additives | 0.4-0.8 | |
| In-can Preservative | 0.2-0.5 | |
| Extender Pigment 1 | 5.5-7.5 | |

Additional Ingredients for Comparison

| | | |
|---|---|---|
| Extender Pigment 2 | 8 | — |
| Glass Bubble 2 | — | 5.5 |

TABLE 8

Paint properties

| | Comparison Example E | Example 9 |
|---|---|---|
| Solid volume % | 45.3 | 46.6 |
| Tint Strength | 100 | 102 |
| Contrast Ratio | 98.22 | 98.45 |
| Viscosity, ICI (3 Days) | 1.5 | 1.4 |
| Viscosity, KU (3 Days) | 110 | 106 |
| 60°/85° Gloss | 4.9/3.8 | 5.1/5.6 |
| Hiding Score (24B chart) | 4 | 5 |
| Roller application hide (CU-1M) | 3 | 4 |

More Example Formulations

Table 9 provides the basic formulation for lower pigment volume concentration (PVC) paints (Eggshell), Examples F and 10, 11. For the lower PVC paint, example 10, 11 with glass bubbles still exhibits better hiding compared to control paint example F as listed in the table while both examples F and 10, 11 have comparable tint strength, viscosity, contrast ratio, and gloss, shown in Table 10. Improvement of hiding over time was also observed by comparing the hiding of fresh paint versus 1 day aged paint. The hiding power of paint Example 10 and 11 with glass bubble increased at a larger scale than the control paint Example F. Comparing Example 10 and 11, more increase in hiding power was observed in Example 11 with higher amount of glass bubble.

TABLE 9

Example Formula 10-11 for Eggshell Paint

| Material | Comparison Example F | Example 10 Weight % | Example 11 |
|---|---|---|---|
| Acrylic Polymer | | 40-44 | |
| TiO$_2$ Slurry (76 wt %) | | 30-32 | |
| Water | | 4-6.5 | |
| Ethylene Glycol | | 0.5-2.5 | |
| High Shear Rheology Modifier | | 0.5-2.5 | |
| Coalescent Agent | | 0.5-2.5 | |
| Dispersant | | 0.5-1.5 | |
| Wetting Agent | | 0.25-1.5 | |
| Mildewcide | | 0.2-0.4 | |
| Defoamer | | 0.5-0.9 | |
| Opaque Polymer | | 1.5-3.5 | |
| Low Shear Rheology Modifier | | 0.1-0.3 | |
| Other Additives | | 0.6-1.0 | |
| In-can Preservative | | 0.2-0.5 | |
| Pigment 1 | | 5.5-7.5 | |

Additional Ingredients for Comparison

| | | | |
|---|---|---|---|
| Pigment 2 | 5.5 | 3.5 | — |
| Glass Bubble 2 | — | 0.9 | 3.6 |

TABLE 10

Paint properties

| | Comparison Example F | Example 10 | Example 11 |
|---|---|---|---|
| Solid volume % | 44.5 | 43.6 | 44.9 |
| Tint Strength | 100 | 103.8 | 104.1 |
| Contrast Ratio | 98.34 | 98.46 | 98.72 |
| Viscosity, ICI (3 Days) | 1.3 | 1.3 | 1.5 |
| Viscosity, (KU (3 Days) | 89 | 90 | 94 |
| 60°/85° Gloss (3 Days) | 10.5/18.2 | 12.1/23.2 | 10.2/18.0 |
| Hiding Score (24B chart), fresh | 3 | 3.5 | 3.5 |
| Hiding Score (P300-7C chart), fresh | 3 | 3.5 | 3.5 |
| Hiding Score (24B chart), 1 day | 4 | 4.5 | 5 |
| Hiding Score (P300-7C chart), 1 day | 4 | 4.5 | 5 |

Table 11 provides the basic formulation for satin paint, examples G and 12. In this pair of satin paints, example 12 with glass bubbles still exhibits better hiding compared to example G as listed in the table while both examples G and 12 have similar tint strength, viscosity, and gloss.

TABLE 11

Example Formula 12 for Satin Paint

| | Comparison Example G | Example 12 |
|---|---|---|
| Acrylic Polymer | 44-48 | |
| TiO$_2$ Slurry (76 wt %) | 32.5-34.5 | |
| Water | 4-8 | |
| Ethylene Glycol | 0.5-2.5 | |
| High Shear Rheology Modifier | 0.5-2.5 | |
| Coalescent Agent | 0.5-2.5 | |
| Dispersant | 0.5-1.5 | |

TABLE 11-continued

Example Formula 12 for Satin Paint

|  | Comparison Example G | Example 12 |
| --- | --- | --- |
| Wetting Agent | 0.25-1.5 | |
| Mildewcide | 0.2-0.4 | |
| Defoamer | 0.5-0.9 | |
| Opaque Polymer | 0.5-2.5 | |
| Low Shear Rheology Modifier | 0.1-0.3 | |
| Other Additives | 0.6-1.0 | |
| In-can Preservative | 0.2-0.5 | |
| Additional Ingredients for Comparison | | |
| Extender Pigment 3 | 5.8 | — |
| Extender Pigment 4 | — | 2.7 |
| Glass Bubble 1 | — | 1 |

TABLE 12

Paint properties

|  | Comparison Example G | Example 12 |
| --- | --- | --- |
| Solid volume % | | 99 |
| Tint Strength | 100 | 99 |
| Contrast Ratio | 98.75 | 98.85 |
| Viscosity, ICI (3 Days) | 1.0 | 1.0 |
| Viscosity, KU (3 Days) | 100 | 100 |
| 60°/85° Gloss | 22.4/37 | 20.3/32 |
| Hiding Score (24B chart) | | |
| Hiding Score (P300-7C chart) | 4 | 5 |

Table 13 provides another formulation for satin paint with glass bubble 2, examples H and 13. In this pair of satin paints, example 13 with glass bubbles still exhibits better hiding compared to example H as listed in the table while both examples H and 13 have similar tint strength, viscosity, contrast ratio, and gloss.

TABLE 13

Example Formula 13 for Satin Paint

| Material | Comparison Example H Weight % | Example 13 |
| --- | --- | --- |
| Acrylic Polymer | 44-48 | |
| TiO$_2$ Slurry (76 wt %) | 33-34 | |
| Water | 4-6.5 | |
| Ethylene Glycol | 0.5-2.5 | |
| High Shear Rheology Modifier | 0.5-2.5 | |
| Coalescent Agent | 0.5-2.5 | |
| Dispersant | 0.5-1.5 | |
| Wetting Agent | 0.25-1.5 | |
| Mildewcide | 0.2-0.4 | |
| Defoamer | 0.5-0.9 | |
| Opaque Polymer | 1.0-3.0 | |
| Low Shear Rheology Modifier | 0.1-0.3 | |
| Other Additives | 0.6-1.0 | |
| In-can Preservative | 0.2-0.5 | |
| Additional Ingredients for Comparison | | |
| Extender Pigment 3 | 5.8 | 1 |
| Extender Pigment 4 | 0 | 2.7 |
| Glass Bubble 2 | — | 1.5 |

TABLE 14

Paint properties

|  | Comparison Example H | Example 13 |
| --- | --- | --- |
| Solid volume % | 42.4 | 43.2 |
| Tint Strength | 100 | 100 |
| Contrast Ratio fresh | 98.44 | 98.63 |
| Contrast Ratio 1 Day | 98.51 | 98.88 |
| Viscosity, ICI (3 Days) | 1.40 | 1.47 |
| Viscosity, (KU (3 Days) | 115 | 109 |
| 60°/85° Gloss (3 Days) | 18.8/36.5 | 22.4/35.8 |
| Hiding (3 mil on Leneta 3B), 1 day aged paint | control | better |

Table 15 shows the example formulations of semigloss paint, no glass bubble, with glass bubble 2. Limited by the gloss development, only a small percentage of glass bubble can be used in the semigloss paint. However, noticeable improvement in hiding power and film property was observed at this low level, although not as the same degree as the flat paint with high loading of glass bubble.

TABLE 15

Example Formula for Semigloss paint

| Material | Comparison Example J Weight % | Example 14 |
| --- | --- | --- |
| Acrylic Polymer | 48-52 | |
| TiO$_2$ Slurry (76 wt %) | 32-36 | |
| Water | 3-6 | |
| Ethylene Glycol | 0.5-1.0 | |
| High Shear Rheology Modifier | 1-3 | |
| Coalescent Agent | 0.5-2.5 | |
| Dispersant | 0.5-1.5 | |
| Wetting Agent | 0.25-1.5 | |
| Mildewcide | 0.2-0.4 | |
| Defoamer | 0.5-0.9 | |
| Opaque Polymer | 1.5-3.5 | |
| Low Shear Rheology Modifier | 0.1-0.3 | |
| Other Additives | 0.6-1.0 | |
| In-can Preservative | 0.2-0.5 | |
| Additional Ingredients for Comparison | | |
| Extender pigment | 0.7 | — |
| Glass bubble 2 | — | 0.5 |

TABLE 16

Paint properties

|  | Comparison Example J | Example 14 |
| --- | --- | --- |
| Solid volume % | 41.191 | 41.358 |
| Tint Strength | 100 | 100 |
| Contrast Ratio | 99.31 | 98.96 |
| Viscosity, ICI (3 Days) | 1.33 | 1.29 |
| Viscosity, KU (3 Days) | 113 | 107 |
| 60°/85° Gloss | 53/84 | 51/77 |
| Hiding (3 mil on 24B), equilibrated paint | control | better |

Improved Dry Film Properties

Besides the improved hiding, enhancement in paint film properties were also observed in the paints containing glass bubbles, such as block resistance, stain removal, stain-blocking. Block resistance is tested according to ASTM D4946; stain removal is tested with Leneta stain media ST-1 by D2198 protocol; stain-blocking was tested by assessing coverage of stains with 2 coats of paint.

TABLE 17

Dry film properties of flat paint

| | Paint Sheen | | | |
| | Flat | Flat | Flat | Flat |
| Sample ID | Comparison Example C | Example 7 glass bubble | Comparison Example E | Example 9 glass bubble |
| --- | --- | --- | --- | --- |
| | no | glass bubble 1 | no | glass bubble 2 |
| Stain-blocking | | | | |
| Crayon | control | = | control | = |
| Lipstick | control | = | control | + |
| Black permanent marker | control | + | control | + |
| Washable marker | control | = | control | + |
| Coffee | control | = | control | + |
| Stain-removal | | | | |
| Black thin oil stain (ASTM stain) | control | + | control | + |
| Block resistance | control | + | control | + |

TABLE 18

Dry film properties of eggshell paint

| | Paint Sheen Eggshell | |
| Sample ID | Comparison Example F | Example 11 glass bubble |
| --- | --- | --- |
| | no | glass bubble 2 |
| Stain-blocking | | |
| Crayon | control | = |
| Lipstick | control | + |
| Black permanent marker | control | + |
| Washable marker | control | + |
| Coffee | control | + |
| Stain-removal | | |
| Black thin oil stain (ASTM stain) | control | + |
| Block resistance | control | + |

TABLE 19

Dry film properties of satin paint

| | Paint Sheen | | | |
| | Satin | Satin | Satin | Satin |
| Sample ID | Comparison Example G | Example 12 glass bubble | Comparison Example H | Example 13 glass bubble |
| --- | --- | --- | --- | --- |
| | no | glass bubble 1 | no | glass bubble 2 |
| Stain-blocking | | | | |
| Crayon | control | = | control | = |
| Lipstick | control | + | control | + |
| Black permanent marker | control | = | control | = |
| Washable marker | control | + | control | + |
| Coffee | control | + | control | + |
| Stain-removal | | | | |
| Black thin oil stain (ASTM stain) | control | + | control | + |
| Block resistance | control | + | control | + |

TABLE 20

Dry film properties of semigloss paint

| | Paint Sheen Semi-Gloss | |
| Sample ID | Comparison Example J | Example 14 glass bubble |
| --- | --- | --- |
| | no | glass bubble 2 |
| Stain-blocking | | |
| Crayon | control | = |
| Lipstick | control | + |
| Black permanent marker | control | + |
| Washable marker | control | + |
| Coffee | control | + |
| Stain-removal | | |
| Black thin oil stain (ASTM stain) | control | = |
| Block resistance | control | + |

Resin Study

It is important that adding hollow glass spheres can improve hiding and dry film properties. The aforementioned examples are done in type A resin system. The study was expanded to a number of resin systems and it was found the hiding improvement is related to resin-pigment affinity, the stronger the interaction is, the more hiding improvement can be seen over time. Resin-pigment affinity can be measured by adding TiO2 slurry into the resin at 1:1 ratio; for example, 100 g Kronos 4311 slurry into 100 g latex polymer, then observe the cleanliness of the mixture at low shear then high sheer. 5 resin systems were tested and described in Table 21.

TABLE 21

Resin-pigment interaction

| Resin | Observation | Association with $TiO_2$ |
| --- | --- | --- |
| A | Clumps are formed at low shear, can't be broken down at high shear. | strong interaction |
| B | Clumps are formed at low shear, can't be broken down at high shear. | strong interaction |

TABLE 21-continued

Resin-pigment interaction

| Resin | Observation | Association with $TiO_2$ |
|---|---|---|
| C | Clumps are formed at low shear, can be mostly broken down at high shear. | medium |
| D | Clumps are formed at low shear, can be mostly broken down at high shear. | medium |
| E | TiO2 mixed in uniformly, no clump formed. | weak or no interaction |

Glass bubble 1 were formulated into 5 resin systems, A~E, and compared with control paint without glass bubble, listed in Table 19.

TABLE 22

Glass bubble study in resin system A~E

| Resin | Paint Sheen | Paint # | glass bubble 1 lb/100 gal | Paint | glass bubble 1 lb/100 gal |
|---|---|---|---|---|---|
| A | interior flat | A1 | 20 | A2 | 0 |
| B | exterior flat | B1 | 20 | B2 | 0 |
| C | interior flat | C1 | 20 | C2 | 0 |
| D | interior flat | D1 | 20 | D2 | 0 |
| E | exterior satin | E1 | 10 | E2 | 0 |

Each pair of paint, for example A1 and A2, B1 and B2, and so on, was made at the same time. And each pair was made twice to check if the hiding gets better next day. For comparison, the control paints without glass bubble was also made the same way to see if the hiding changes over time. Contrast ratio and reflectance were tested with X-rite SP-64 spectrophotomer. The contrast ratio increased during the first day after being made in resin system A~D with glass bubble, with A the most. Paint E1 did not show noticeable hiding improvement over the first day after being made.

TABLE 23

Contrast ratio data

| Paint | fresh | 1 day | Delta (1 day-fresh) |
|---|---|---|---|
| A1 | 97.8 | 98.6 | 0.7 |
| B1 | 98.4 | 98.7 | 0.3 |
| C1 | 97.2 | 97.6 | 0.3 |
| D1 | 97.9 | 98.3 | 0.4 |
| E1 | 98.0 | 98.0 | 0.0 |
| A2 | 98.3 | 98.4 | 0.1 |
| B2 | 98.4 | 98.3 | −0.1 |
| C2 | 97.3 | 97.4 | 0.1 |
| D2 | 97.8 | 98.3 | 0.5 |
| E2 | 98.2 | 98.3 | 0.2 |

The visual hide was evaluated by comparing the paint samples side by side on the same drawdown, and given it a rating in the Table below, where '+' is better, '++' and '+++' means hiding improvement was observed at a increasing degree.

TABLE 24

3 mil visual hide data

| Resin | A1-fresh vs. A2-fresh | A1-1 day vs. A2-1 day | A1-1 day vs A1-fresh |
|---|---|---|---|
| A | = | +++ | +++ |
| B | = | ++ | ++ |
| C | = | + | + |
| D | = | + | + |
| E | = | = | = |

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments, variations, and refinements may be combined to form further embodiments of the invention.

What is claimed is:

1. A paint composition comprising:
   water;
   a film-forming polymer that includes polyvinyl alcohol;
   pigments selected from the group consisting of azo dyes, phthalocyanine, anthraquinone dyes, and combinations thereof; and
   a plurality of hollow glass spheres dispersed in the paint composition, the hollow glass spheres encapsulating air voids in coatings formed from the paint composition and having an average diameter greater than or equal to 12 microns and less than or equal to 50 microns wherein the plurality of hollow glass spheres is present in an amount of 10-40 pounds of hollow glass spheres per 100 gallons of paint.

2. The paint composition of claim 1 wherein the film-forming polymer is an emulsion polymer.

3. The paint composition of claim 1 wherein the hollow glass spheres can replace a portion of the pigments or be added in addition to pigments in a standard paint composition.

4. The paint composition of claim 1 wherein the pigments include titanium oxide.

5. The paint composition of claim 1 wherein:
   the film-forming polymer is present in an amount from about 25 to 60 weight percent of the total weight of the paint composition;
   the pigments are present in an amount from about 5 to 40 weight percent of the total weight of the paint composition;
   the plurality of hollow glass spheres is present in an amount from about 0.1 to 8 weight percent of the total weight of the paint composition; and
   the balance is water.

6. The paint composition of claim 5 further comprising one or more additives selected from the group consisting of rheology modifiers, surfactants, defoamers, organic solvents, pH adjusters, dispersants, coalescents, biocides, and combinations thereof.

7. The paint composition of claim 6 wherein the additives are present in an amount from about 0.1 to 20 weight percent of the total weight of the paint composition.

8. The paint composition of claim 1 wherein the film-forming polymer is formed by one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, ethylene, propylene, 1-butylene, 2 butylene, vinyl acetate, functional monomers, phosphorus-containing functional monomers, acidic group monomers, and combinations thereof.

9. The paint composition of claim 1 wherein the plurality of hollow glass spheres has the average diameter greater than or equal to 15 microns and less than or equal to 25 microns.

10. A paint composition comprising:
water;
a film-forming polymer that includes polyvinyl alcohol;
pigments; and
a plurality of hollow glass spheres dispersed in the paint composition, the hollow glass spheres encapsulating air voids in coatings formed from the paint composition and having an average diameter greater than or equal to 12 microns and less than or equal to 50 microns.

11. The paint composition of claim 10 wherein the film-forming polymer is an emulsion polymer.

12. The paint composition of claim 11 wherein the emulsion polymer is acrylic polymer, vinyl acrylic copolymer, ethylene-vinyl acetate copolymer, styrene-acrylic copolymer, or polyvinyl alcohol.

13. The paint composition of claim 10 wherein the hollow glass spheres can replace a portion of the pigments or be added in addition to pigments in a standard paint composition.

14. The paint composition of claim 10 wherein the pigments include titanium oxide.

15. The paint composition of claim 10 wherein the plurality of hollow glass spheres is present in an amount of 5 to 65 pounds of hollow glass spheres per 100 gallons of paint.

16. The paint composition of claim 10 wherein the plurality of hollow glass spheres is present in an amount of 10-40 pounds of hollow glass spheres per 100 gallons of paint.

17. The paint composition of claim 10 wherein:
the film-forming polymer is present in an amount from about 25 to 60 weight percent of the total weight of the paint composition;
the pigments are present in an amount from about 5 to 40 weight percent of the total weight of the paint composition;
the plurality of hollow glass spheres is present in an amount from about 0.1 to 8 weight percent of the total weight of the paint composition; and
the balance is water.

18. The paint composition of claim 17 further comprising one or more additives selected from the group consisting of rheology modifiers, surfactants, defoamers, organic solvents, pH adjusters, dispersants, coalescents, biocides, and combinations thereof.

19. The paint composition of claim 18 wherein the additives are present in an amount from about 0.1 to 20 weight percent of the total weight of the paint composition.

20. The paint composition of claim 10 wherein the film-forming polymer is formed by one or more monomers selected from the group consisting of methacrylate, methyl acrylate, ethyl acrylate, 2-chloroethyl vinyl ether, 2-ethylhexyl acrylate, hydroxyethyl methacrylate, butyl acrylate, butyl methacrylate, trimethylolpropane triacrylate, pentafluorophenyl methacrylate, pentafluorophenyl acrylate, 1,1,1,3,3,3-hexafluoroisopropyl acrylate, bis-(2,2,2-trifluoroethyl) itaconate, bis-(1,1,1,3,3,3-hexafluoroisopropyl), 1H,1H,3H-hexafluorobutyl acrylate, 1H,1H,7H-dodecafluoroheptyl methacrylate, 2,2,2-trifluoroethyl acrylate, 2,2,2-trifluoroethyl methacrylate, aliphatic, fluorinated aliphatic, 1H,1H,2H,2H-Heptadecafluorodecyl methacrylate 532.2 acrylic, 1H,1H,2H,2H-heptadecafluorodecyl acrylate, 1H,1H,5H-octafluoropentyl acrylate, 1H,1H,3H-tetrafluoropropyl methacrylate, hexafluoro-iso-propyl, 1H,1H,3H-hexafluorobutyl methacrylate, 1H,1H,5H-octafluoropentyl methacrylate, ethylene, propylene, 1-butylene, 2 butylene, vinyl acetate, functional monomers, phosphorus-containing functional monomers, acidic group monomers, and combinations thereof.

21. The paint composition of claim 10 wherein the plurality of hollow glass spheres has the average diameter greater than or equal to 15 microns and less than or equal to 25 microns.

22. The paint composition of claim 10 wherein the pigments are selected from the group consisting of azo dyes, phthalocyanine, anthraquinone dyes, and combinations thereof.

* * * * *